(12) United States Patent
Okuda et al.

(10) Patent No.: US 8,040,529 B2
(45) Date of Patent: Oct. 18, 2011

(54) DISPLACEMENT SENSOR

(75) Inventors: Takahiro Okuda, Fukuchiyama (JP);
Takahiro Suga, Fukuchiyama (JP);
Hiroaki Takimasa, Ayabe (JP);
Shinsuke Yamakawa, Nara (JP)

(73) Assignee: Omron Corporation, Kyoto (JP)

( * ) Notice: Subject to any disclaimer, the term of this patent is extended or adjusted under 35 U.S.C. 154(b) by 60 days.

(21) Appl. No.: 12/712,475

(22) Filed: Feb. 25, 2010

(65) Prior Publication Data

US 2010/0231925 A1    Sep. 16, 2010

(30) Foreign Application Priority Data

Mar. 13, 2009    (JP) ................ P2009-061636

(51) Int. Cl.
*G01B 11/14*    (2006.01)

(52) U.S. Cl. .................. 356/614; 356/622

(58) Field of Classification Search .......... 356/614–640
See application file for complete search history.

(56) References Cited

FOREIGN PATENT DOCUMENTS

JP        3513817 B2    1/2004

*Primary Examiner* — Tri T Ton
(74) *Attorney, Agent, or Firm* — Foley & Lardner LLP

(57) ABSTRACT

A focused image is taken around the focal point by a confocal displacement meter. In a measurement apparatus, a confocal displacement meter system OPT-A includes a laser diode 1, a collimator lens 4, an objective lens 6, a half mirror 3, a diaphragm plate 31, and a photodiode 2. An observation image imaging system OPT-B is a telecentric light receiving optical system, and the observation image imaging system OPT-B includes a white light source 94, an objective lens 6, a dichroic mirror 5, a diaphragm plate 81, an image formation lens 82, and an image sensor 9. The collimator lens 4 is swept by an oscillator 7 in a two-headed arrow direction. A diameter of a diaphragm hole of the diaphragm plate 81 is set such that a depth of field of the objective lens 6 is not lower than sweep amplitude of the collimator lens 4.

6 Claims, 17 Drawing Sheets

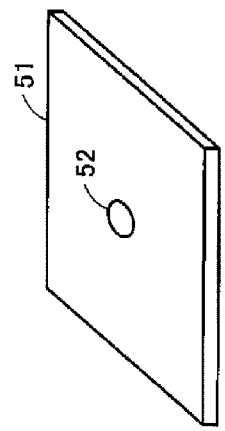
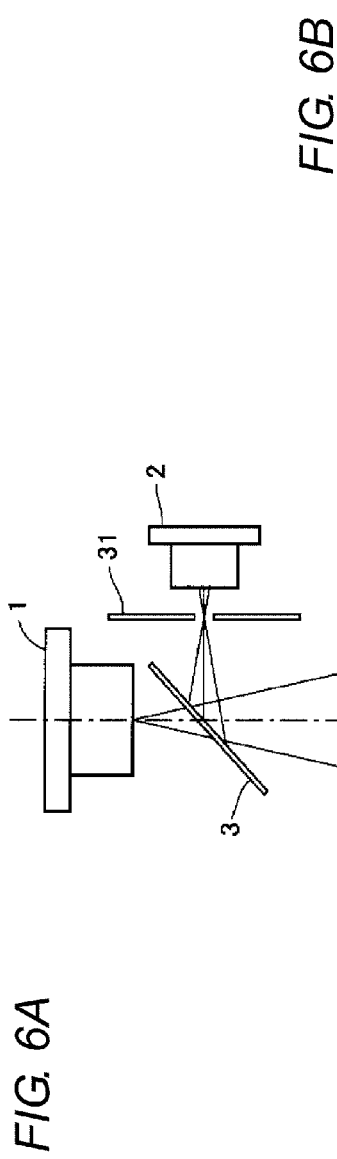
FIG. 6B
FIG. 6A

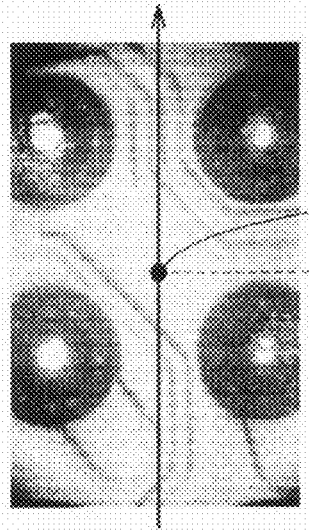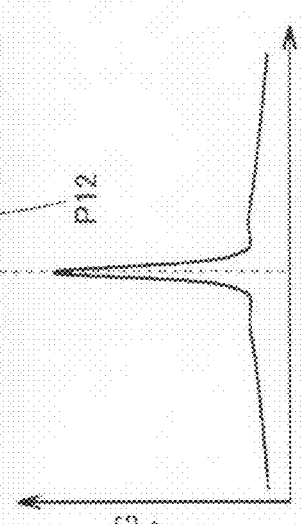
FIG. 13C
C3: SHUTTER OPENED TIME IS SUFFICIENTLY LONGER THAN LD POWER-OFF TIME
MEASURING SPOT IS CLEARLY VISIBLE ON IMAGE
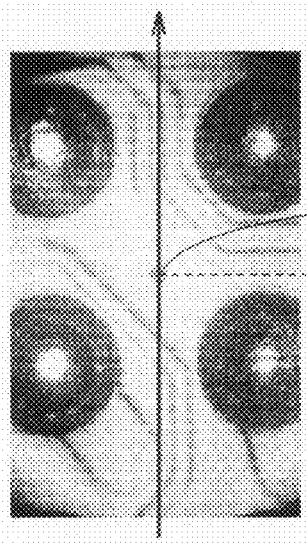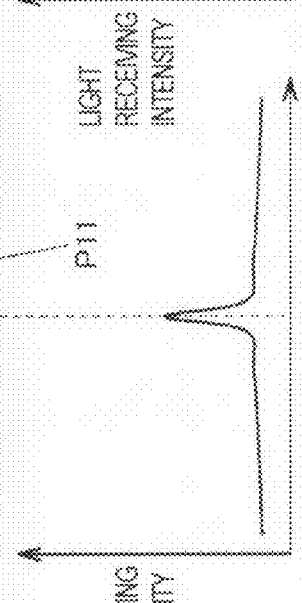
FIG. 13B
C2: SHUTTER OPENED TIME IS SLIGHTLY LONGER THAN LD POWER-OFF TIME
MEASURING SPOT IS INDISTINCTLY VISIBLE ON IMAGE
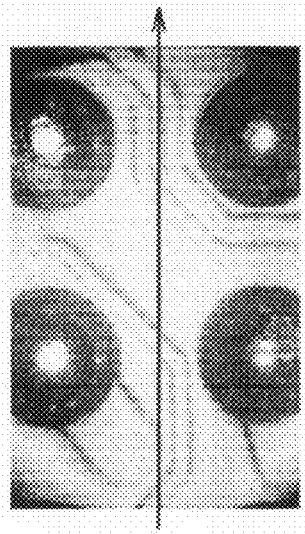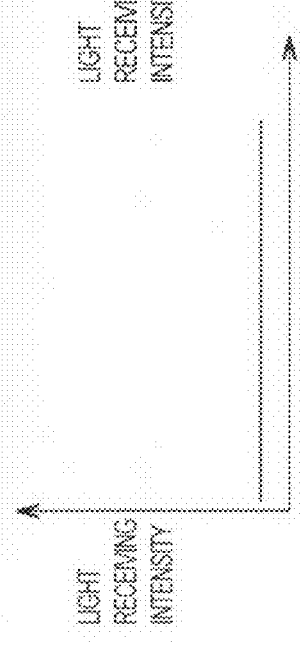
FIG. 13A
C1: SHUTTER OPENED TIME IS EQUAL TO OR SHORTER THAN LD POWER-OFF TIME
MEASURING SPOT IS INVISIBLE ON IMAGE

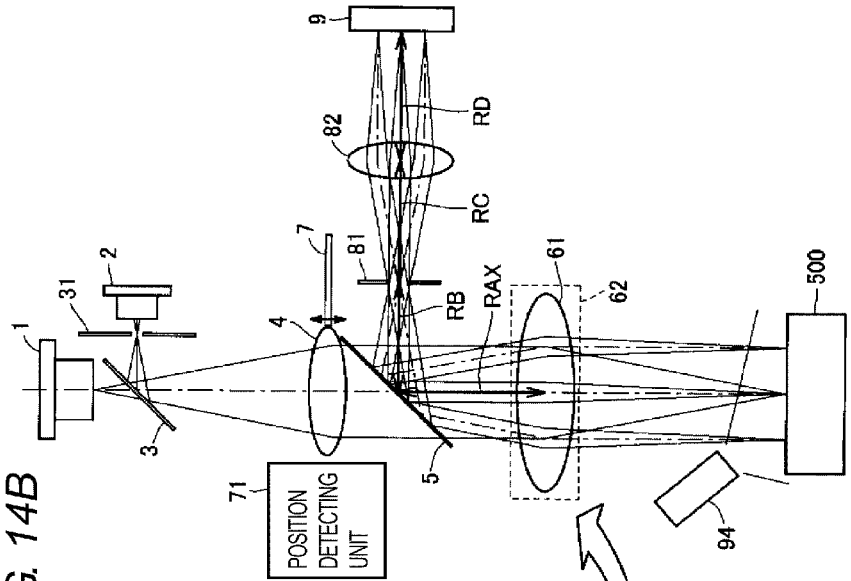
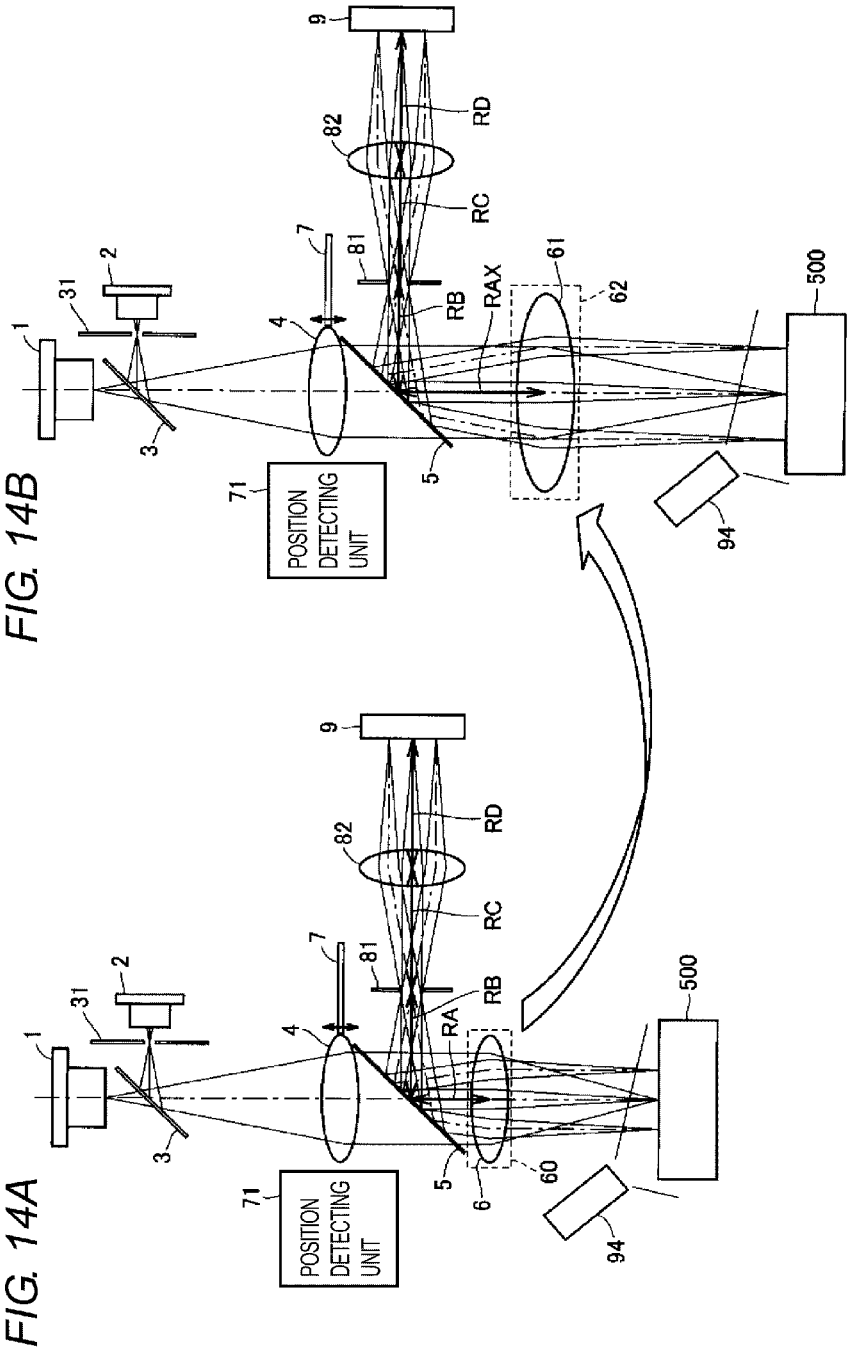

DISPLACEMENT SENSOR

BACKGROUND OF THE INVENTION

This application is based on Japanese Patent Application No. 2009-061636 filed with the Japanese Patent Office on Mar. 13, 2009, the entire content of which is hereby incorporated by reference.

1. Technical Field

The present invention relates to a displacement sensor with a confocal optical system, in which a displacement of a measurement object is measured in a noncontact manner and obtains an image around a measuring point.

2. Related Art

Conventionally, for example, as disclosed in Japanese Patent No. 3513817, the displacement sensor in which the confocal optical system is used includes an imaging device that takes an image of an object whose displacement is measured thereby.

Specifically as illustrated in FIG. 16, the displacement sensor includes a light source 901 that emits light to an object to be measured 900, an imaging light source 913 that emits light having a wavelength different from that of the light emitted from the light source 901 to the object to be measured 900, an objective lens 906 through which the reflected light of the light source 901 from the object to be measured 900 and the reflected light of the imaging light source 913 from the object to be measured 900 pass, a beam splitter 905 to which each pieces of reflected light passing through the objective lens 906 is incident, an imaging device 909 that takes an surface image of the object to be measured with the light reflected from the beam splitter 905, a light receiving device 902 that receives light transmitted through the beam splitter 905, the light being the light reflected from the object to be measured 900, and a beam splitter 903 that leads the light transmitted through the beam splitter 905 to the light receiving device 902.

In the displacement sensor, the objective lens 906 is oscillated with predetermined amplitude using an excitation coil, and the imaging device 909 takes an image in a position of the objective lens 906, in which a light receiving amount becomes the maximum in the light receiving device 902. Therefore, the imaging device 909 can take the image when the light is collected onto the surface of the object to be measured 900.

However, in the conventional displacement meter, when irregularity exists in the surface of the object to be measured 900 as illustrated in FIG. 16, the image that is taken with the imaging device 909 at the time the light is collected on the surface of the object to be measured becomes the image that is out of focus at levels except the displacement measuring point as illustrated in FIG. 17.

In the displacement sensor, there is a demand for a function of being able to confirm the measuring point using the clear image within the measurement range in the irregular object to be measured.

SUMMARY

The present invention has been devised to solve the problems described above, and an object thereof is to obtain the clear image even in levels except the displacement measuring point in the object to be measured using the confocal displacement sensor.

In accordance with one aspect of the present invention, provided is a displacement sensor including a confocal displacement meter that determines a surface displacement from a light collecting position at time a light receiving amount becomes maximum and includes: a first light projecting unit that emits light having a first wavelength; a first light receiving unit that receives the light having the first wavelength; a sweep light collecting unit that collects the light emitted from the first light projecting unit toward a measurement object to illuminate the measurement object, changes continuously a collecting position of the light along an optical axis direction of the collected light, causes reflected light of the light with which the measurement object is illuminated to travel in a direction opposite to an optical path of the light emitted from the first light projecting unit, and leads the reflected light to the first light receiving unit; and a first optical path separating unit that separates an optical path of the reflected light from an optical path from the first light projecting unit to the measurement object; the displacement sensor including: a second light projecting unit that emits light having a second wavelength different from the first wavelength to the measurement object; a second optical path separating unit that separates an optical path of the light having the second wavelength reflected on the measurement object through the optical path of the reflected light; and a second light receiving unit that receives the light whose optical path is separated by the second optical path separating unit, and wherein the second light receiving unit is a telecentric optical system including an imaging device and an opening diaphragm, a diameter of the opening diaphragm being designed such that the telecentric optical system has a depth of field not lower than a range in which the light collecting position changed by the sweep light collecting unit.

In the displacement sensor according to the aspect of the present invention, preferably the sweep light collecting unit includes: an objective lens that collects the light emitted from the first light projecting unit toward the measurement object to illuminate the measurement object; and a collimator lens that is provided between the first light projecting unit and the objective lens in order to convert the light emitted from the first light projecting unit to the objective lens into parallel light, and the second optical path separating unit is provided between the objective lens and the collimator lens.

In the displacement sensor according to the aspect of the present invention, preferably the second optical path separating unit is formed by a mirror having an opening through which the light having the second wavelength passes, the diameter of the opening diaphragm being illuminated with the light having the second wavelength, and the second optical path separating unit and the opening diaphragm are integrally formed.

In the displacement sensor according to the aspect of the present invention, preferably the second light receiving unit includes a relay lens that is provided between the second optical path separating unit and the opening diaphragm.

In the displacement sensor according to the aspect of the present invention, preferably the second light receiving unit receives the light delivered to the opening diaphragm through the objective lens, the light being the light reflected on the measurement object, the objective lens is attached in a position in which an optical path length of the light reflected on the measurement object to the opening diaphragm becomes a rear-side focal distance of the objective lens, the objective lens is exchangeably configured into another objective lens having the rear-side focal distance different from that of the objective lens, and the another objective lens is attached in a position in which the optical path length of the light reflected on the measurement object to the opening diaphragm becomes the rear-side focal distance of the another objective lens, when the objective lens is exchanged into the another objective lens.

Preferably the displacement sensor according to the aspect of the present invention further includes: a first adjusting unit that adjusts whether the light emitted from the first light projecting unit on the measurement object is included in an image taken with the imaging device; and a second adjusting unit that adjusts brightness of the image taken with the imaging device, wherein by controlling an imaging device accumulation time, a first light projecting unit emitting time and a second light projecting unit emitting time, the first adjusting unit adjusts whether the light emitted from the first light projecting unit is included or not and the second adjusting unit adjusts the brightness of the image taken with the imaging device.

In the displacement sensor of the aspect of the present invention, even if the sweep light collecting unit changes the light collecting position in the measurement object, the second light receiving unit including the telecentric optical system has the depth of field not lower than the range where the light collecting position changes.

Accordingly, in the present invention, the image taken with the imaging device of the second light receiving unit becomes the image that comes into focus even if the object to be measured has the irregularity around the measuring point of the confocal displacement meter.

In the displacement sensor of the present invention, when the second light receiving unit obtains the image around the measuring point, the second light receiving unit is configured to have the depth of field not lower than the change in focused position in the optical axis direction, which is generated by the sweep light collecting unit. Therefore, when the image around the measuring point is obtained, the definition can be improved to shorten the time for positioning the measuring point of the displacement sensor.

Because the second light receiving unit is configured to has the deeper depth of field, the difference between the image formation positions caused by chromatic dispersion of the lens system can be absorbed even if the second light receiving unit obtains a color image. Therefore, a trouble that the color image is out of focus due to the color to lower the definition of the image around the measuring point can be avoided even if the second light receiving unit obtains the color image.

BRIEF DESCRIPTION OF THE DRAWINGS

FIGS. 6A and 6B schematically illustrate an entire configuration of a displacement sensor according to a fourth embodiment of the present invention;

FIGS. 13A to 13C illustrate a change of an obtained image when an interval of a shutter opened state is varied in the displacement sensor of FIG. 11;

FIGS. 14A and 14B schematically illustrate an entire configuration of a displacement sensor according to a ninth embodiment of the present invention;

DETAILED DESCRIPTION

Figure 1:
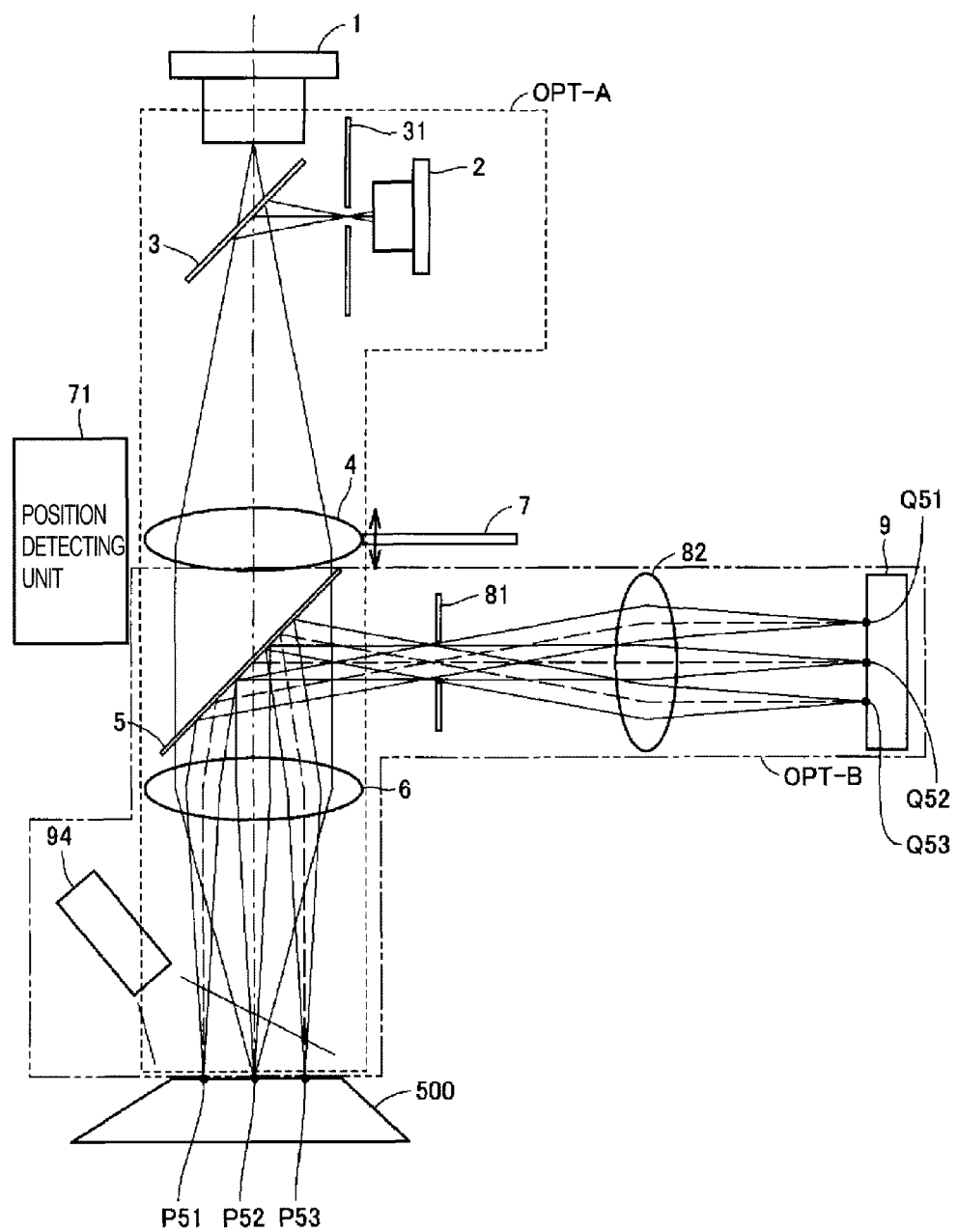
FIG. 1 schematically illustrates an entire configuration of a displacement sensor according to a first embodiment of the present invention.

Hereinafter, preferred embodiments of the present invention will be described with reference to the drawings. In the drawings, the same component is designated by the same numeral, and the overlapping description is omitted.

First Embodiment (Schematic Configuration of Displacement Sensor)

FIG. 1 schematically illustrates an entire configuration of a displacement sensor according to a first embodiment of the present invention.

Referring to FIG. 1, the displacement sensor mainly includes a confocal displacement measuring system OPT-A that measures a displacement on a surface of a measurement object 500 and an observation image imaging system OPT-B that obtains an image of the measurement object 500.

The confocal displacement measuring system OPT-A includes a light source 1, a collimator lens 4, an objective lens 6, a beam splitter 3, a diaphragm plate 31, and a light receiving device 2.

The observation image imaging system OPT-B includes an imaging light source 94, an objective lens 6, a beam splitter 5, a diaphragm plate 81, an image formation lens 82, and an imaging device 9. The observation image imaging system OPT-B is a telecentric optical system.

The objective lens 6 is shared by the confocal displacement meter system OPT-A and the observation image imaging system OPT-B.

In the confocal displacement meter system OPT-A, the collimator lens 4 converts the light emitted from the light source 1 into substantially parallel light, and the surface of the measurement object 500 is illuminated with the light through the objective lens 6. In the first embodiment, because the light converted into the parallel light by the collimator lens 4 is incident to the objective lens 6, a light collecting position of measurement light (light with which the measurement object 500 is illuminated from the light source 1) can be set to a center of a depth of field of the observation image imaging system OPT-B.

The light with which the measurement object 500 is illuminated is reflected by the measurement object 500. The light passing through the beam splitter 5 in the reflected light is reflected by the beam splitter 3 through the objective lens 6 and the collimator lens 4, and the light is delivered to the light receiving device 2 through a diaphragm hole made in diaphragm plate 31.

For example, the beam splitter 5 may be a dichroic mirror that passes wavelengths near those of the light emitted from the light source 1 while reflecting other wavelengths of the visible light. The beam splitter 3 reflects the light having the wavelength near that of the light emitted from the light source 1, and the beam splitter 3 delivers the reflected light to the light receiving device 2.

In the observation image imaging system OPT-B, the light emitted from the imaging light source 94 is reflected on the measurement object 500, the light is reflected by the beam splitter 5 through the objective lens 6, the light is delivered to the image formation lens 82 through a diaphragm hole made in the diaphragm plate 81, and the light forms an image on the imaging device 9 through the image formation lens 82.

FIG. 1 schematically illustrates part of the reflected light from the imaging light source 94. As to these reflection points, three points in the reflection points on the measurement object 500 are expressed as points P51 to P53. The reflected light at each reflection point is incident to the image formation lens 82 through the diaphragm hole of the diaphragm plate 81, and the light forms the image as each of points Q51 to Q53 on the imaging device 9 through the image formation lens 82.

In FIG. 1, an optical axis from the light source 1 to the measurement object 500 is schematically expressed by an alternate long and short dash line.

In the displacement sensor of the first embodiment, during the measurement, the oscillator 7 changes a position of the collimator lens 4 in an optical axis direction, that is, a direction indicated by a two-headed arrow on the oscillator 7 of FIG. 1, thereby changing the collecting position of the light emitted from the light source 1 in the optical axis direction. The light receiving device 2 receives the light reflected from the measurement object. The displacement sensor includes members, such as a driving coil 74, which oscillate the oscillator 7 in the two-headed arrow direction of FIG. 1.

The collimator lens 4 moves in the direction in which the collimator lens 4 comes close to the measurement object 500 and the direction in which the collimator lens 4 recedes from the measurement object 500 according to the oscillation of the oscillator 7. The position detecting unit 71 detects the position of the collimator lens 4 during the oscillation. The signal processing unit 73 computes the position of the collimator lens 4 by performing appropriately a signal supplied from the position detecting unit 71.

In the displacement sensor of the first embodiment, the light source 1 constitutes the first light projecting unit, and the light receiving device 2 constitutes the first light receiving unit. In the displacement sensor of the first embodiment, the objective lens 6, the collimator lens 4, and the oscillator 7 constitute the sweep light collecting unit.

In the displacement sensor of the first embodiment, the imaging light source 94 constitutes the second light projecting unit, and the imaging device 9 constitutes the second light receiving unit.

In the displacement sensor of the first embodiment, the beam splitter 3 constitutes the first optical path separating unit, and the beam splitter 5 constitutes the second optical path separating unit.

(Block Configuration of Displacement Sensor)

Figure 2:
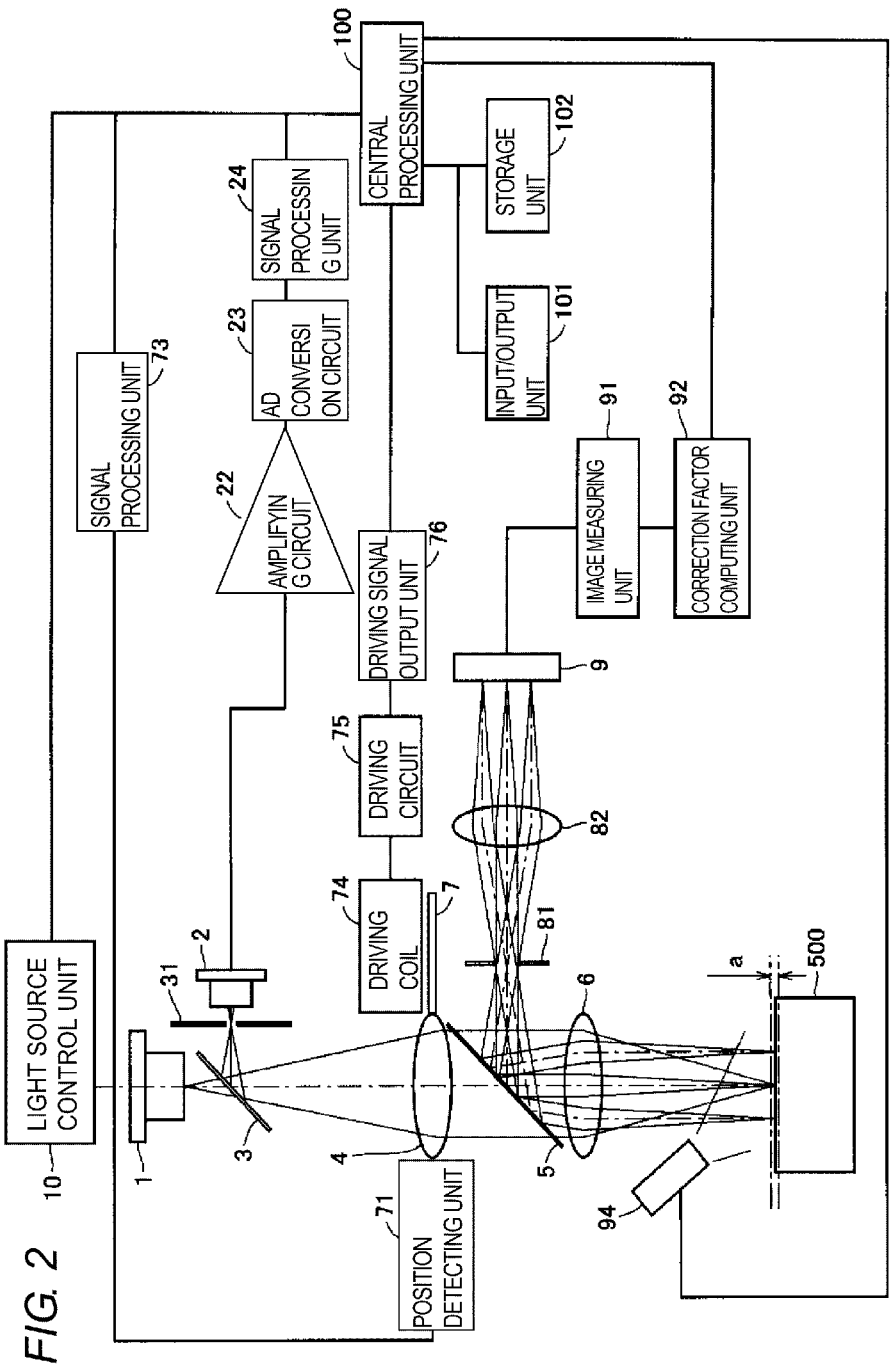
FIG. 2 illustrates a block configuration of the displacement sensor of FIG. 1.

FIG. 2 illustrates a block configuration of the displacement sensor of FIG. 1.

In addition to the above-described components, the displacement sensor includes a central processing unit 100 that wholly controls an operation of the displacement sensor. The displacement sensor also includes a light source control unit 10, a signal processing unit 73, an amplifying circuit 22, an AD (Analog to Digital) conversion circuit 23, a signal processing unit 24, a driving circuit 75, and a driving signal output unit 76. These components may be implemented by a dedicated hardware resource, or CPU (Central Processing Unit) included in the displacement sensor may execute a program, recorded in a recording device included in the displacement sensor, to realize the components. The displacement sensor also includes an input/output unit 101 and a storage unit 102. The input/output unit 101 includes input devices such as a keyboard and output devices such as a monitor. The storage unit 102 includes a recording device.

In the displacement sensor, a distance between the light source 1 and the collimator lens 4 changes when the driving coil 74 oscillates the collimator lens 4 in the two-headed arrow direction of FIG. 1. The collimator lens 4 delivers parallel light to the objective lens 6 when the distance between the light source 1 and the collimator lens 4 is equal to a focal distance of the collimator lens 4, and the collimator lens 4 delivers diffusion light or convergent light to the objective lens 6 when the distance is not equal to the focal distance. Therefore, in the light with which the measurement object 500 is illuminated through the objective lens 6, a distance from the objective lens 6 to the light collecting position varies according to the distance between the light source 1 and the collimator lens 4. In the displacement sensor, the central processing unit 100 oscillates the collimator lens 4 such that the collimator lens 4 moves within a range where the light collecting position includes a level at which the surface of the measurement object 500 is presumed to exist, that is, a range including a distance a (see FIG. 2).

In the displacement sensor, the driving circuit 75 energizes the driving coil 74. The driving signal output unit 76 controls an electric conduction mode of the driving circuit 75. The central processing unit 100 controls an operation of the driving signal output unit 76, thereby controlling an oscillation mode of the collimator lens 4.

In the displacement sensor, a signal is supplied from the position detecting circuit 71 to the signal processing unit 73. The central processing unit 100 obtains the position of the collimator lens 4 in oscillation based on a signal supplied from the signal processing unit 73.

In the displacement sensor, the central processing unit 100 controls operations such as turn on/off of the light emitted from the light source 1 through the light source control unit 10.

The central processing unit 100 computes a displacement of the measurement object from the light receiving signal received by the light receiving device 2 when the position of the collimator lens 4 in oscillation, obtained based on the signal from the signal processing unit 73, falls within the range of the distance a. The amplifying circuit 22 amplifies the light receiving signal obtained by the light receiving device 2, and the AD conversion circuit 23 converts the signal into a digital signal. Then the signal processing unit 24 appropriately performs processing of the signal and supplies the signal to the central processing unit 100.

The image taken by the imaging device 9 is supplied to the central processing unit 100. In the displacement sensor, a user can input pieces of information such as a measurement condition through the input/output unit 101. In the displacement sensor, data such as the program executed by the central processing unit 100 is stored in the storage unit 102.

(Configuration of Observation Image Imaging System)

The detailed configuration of the observation image imaging system OPT-B in the displacement sensor will be described with reference to FIGS. 3A to 3C.

Figure 3A:
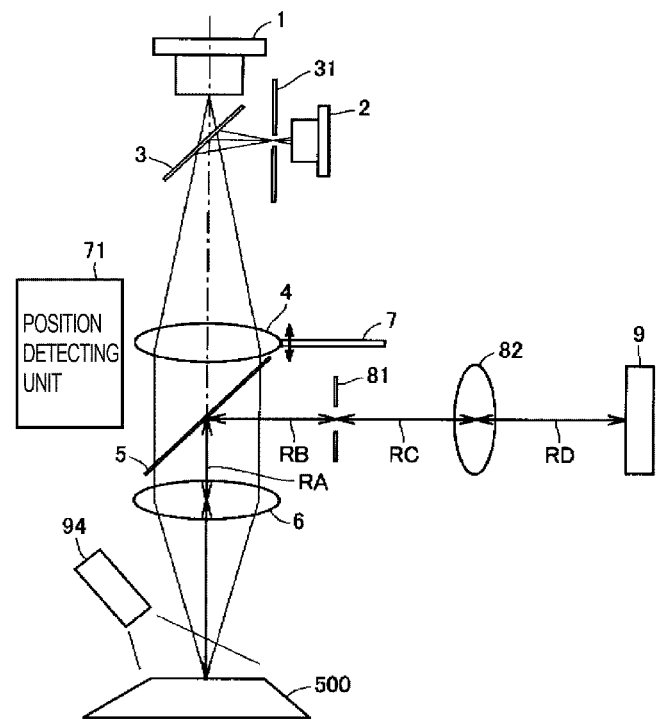
FIGS. 3A to 3C illustrate a detailed configuration of an observation image imaging system in the displacement sensor of FIG. 1.
Figure 3B:
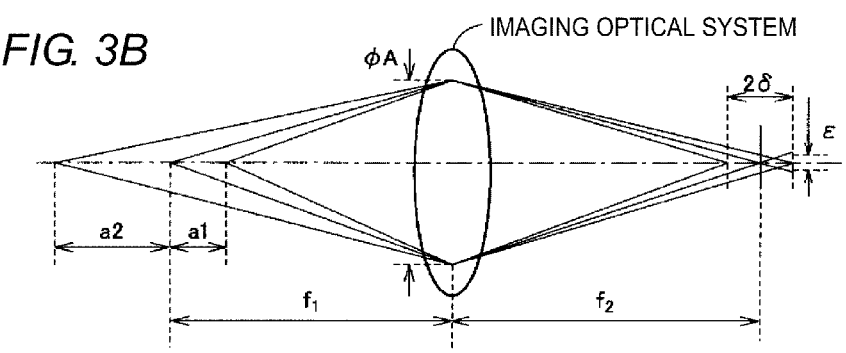

FIG. 3A illustrates a distance on the optical path between components of the observation image imaging system OPT-B of FIG. 1. Specifically, a distance RA expresses an optical path length between a principal point of the objective lens 6 and the beam splitter 5, a distance RB expresses an optical path length between the beam splitter 5 and the diaphragm hole of the diaphragm plate 81, a distance RC expresses an optical path length between the diaphragm hole of the diaphragm plate 81 and the image formation lens 82, and a distance RD expresses an optical path length between the image formation lens 82 and the imaging device 9.

The distance conditions in the displacement sensor will be described below. Because the displacement sensor is the telecentric optical system, in the light reflected on the measurement object 500, only the light having a substantially collimated component forms the image on the imaging device 9. Therefore, the position of the diaphragm hole of the diaphragm plate 81 becomes a rear-side focal position of the objective lens 82, and the substantially collimated light reflected on the measurement object 500 is collected on the rear-side focal position of the objective lens 82. Accordingly, the sum of the distance RA and the distance RB becomes a rear-side focal position of the objective lens 6.

Because the displacement sensor is the telecentric optical system, the light reflected on the measurement object 500 passes through the objective lens 6 and the diaphragm plate 81, and the substantially collimated component forms the image on the imaging device 9 through the image formation lens 82. Therefore, in order to convert the light passing through the diaphragm plate 81 into the substantially collimated component, the image formation lens 82 is disposed in a position in which the diaphragm plate 81 becomes a front-side focal distance of the image formation lens 82. Accordingly, the distance RC becomes the front-side focal distance of the image formation lens 82.

In the displacement sensor, in the light reflected from the measurement object 500, the substantially collimated light passes through the objective lens 6 and the diaphragm plate 81, and the substantially collimated light forms the image on the imaging device 9 through the image formation lens 82. Therefore, the imaging device 9 is disposed in a rear-side focal position of the image formation lens 82, and the substantially collimated light forms the image in the rear-side focal position of the image formation lens 82 through the image formation lens 82. Accordingly, the distance RD becomes the rear-side focal position of the image formation lens 82.

A diameter of the diaphragm hole in the diaphragm plate 81 will be described below. FIG. 3B illustrates a virtual state in which the optical path of the observation image imaging system OPT-B of FIG. 3A is linearly formed. In FIG. 3B, a point PA2 schematically expresses a reflection point on the measurement object 500, and a point PB2 expresses a point at which the light reflected from the point PA2 forms the image on the imaging device 9 through the diaphragm hole of the diaphragm plate 81. A point PB1 and a point PB3 express points at which the pieces of light reflected from a point PA1 and a point PA3 form the images on the imaging device 9 through the diaphragm hole of the diaphragm plate 81, respectively. In FIG. 3B, f1 is a focal distance of the objective lens 6, and f2 is a focal distance of the image formation lens 82.

In the displacement sensor of the first embodiment, the light collecting position of the light outputted from the objective lens 6 changes by sweep (oscillation) of the collimator lens 4. In such cases, the image obtained at an interval in which the collimator lens 4 is swept becomes clear, when the observation image imaging system OPT-B is designed such that the light collecting position of the light outputted from the objective lens 6 includes the surface of the measurement object 500 and changes within the depth of field of the objective lens 6.

Assuming that a is a depth of field of the objective lens 6, a1 is a front-side depth of field of the objective lens 6, and a2 is a rear-side depth of field of the objective lens 6, a relationship among the depth of field a, the front-side depth of field a1, and the rear-side depth of field a2 can be expressed by an equation (1).

$$a = a1 + a2 \qquad (1)$$

Based on the front-side depth of field and the rear-side depth of field when an image formation plane of the imaging device 9 of the image formation lens 82 is set to a reference plane, the front-side depth of field a1 and rear-side depth of field a2 of the objective lens 6 can be described by the following equations (2) and (3) using F-number for the image formation lens 82.

$$a1 = f1^2 \cdot \epsilon \cdot F / (f2^2 + f1 \cdot \epsilon \cdot F) \qquad (2)$$

$$a2 = f1^2 \cdot \epsilon \cdot F / (f2^2 - f1 \cdot \epsilon \cdot F) \qquad (3)$$

In the equations (2) and (3), $\epsilon$ is a diameter of a permissible circle of confusion in the displacement sensor that acts as a visual sensor.

Figure 3C:
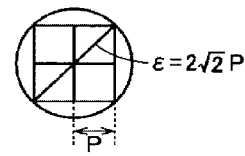

In the displacement sensor of the first embodiment, assuming that P is a sensor pixel pitch of the imaging device 9, the diameter $\epsilon$ of the permissible circle of confusion is set such that the user can recognize that the focus is adjusted within a range double the pixel pitch P as illustrated in FIG. 3C. That is, the diameter $\epsilon$ of the permissible circle of confusion is set as expressed by the following equation (4).

[Formula 1]

$$\epsilon = 2\sqrt{2} P \qquad (4)$$

Generally the F-number is expressed by "(lens focal distance)/(lens diameter)". However, in the first embodiment, it is assumed that only the light passing through the diaphragm hole (opening) of the diaphragm plate 81 forms the image on the imaging device 9 through the image formation lens 82. Therefore, the F-number in the equations (2) and (3) is expressed by the following equation (5). In the equation (5), $\phi A$ is an opening diameter of the diaphragm hole.

$$F = f2 / \phi A \qquad (5)$$

When the equation (5) is substituted for the equations (2) and (3), the equations (2) and (3) can be rewritten into equations (6) and (7).

$$a1 = (f1^2 \cdot \epsilon \cdot f2 / \phi A) / (f2^2 + f1 \cdot \epsilon \cdot f2 / \phi A) \qquad (6)$$

$$a2 = (f1^2 \cdot \epsilon \cdot f2 / \phi A) / (f2^2 - f1 \cdot \epsilon \cdot f2 / \phi A) \qquad (7)$$

In the displacement sensor of the first embodiment, the opening diameter φA is determined such that the depth of field a is not lower than amplitude of the sweep of the collimator lens 4, and the opening diameter φA is set to the diameter of the diaphragm hole of the diaphragm plate 81. Therefore, in the displacement sensor of the first embodiment, the opening diaphragm of the telecentric optical system is designed such that the telecentric optical system has the depth of field not lower than the range of the light collecting position changed by the sweep light collecting unit. In the displacement sensor of the first embodiment, the range of the light collecting position changed by the sweep light collecting unit is obtained by a product of the sweep range of the collimator lens 4 and optical magnification of the confocal optical system.

(Imaging of Color Image)

In the displacement sensor of the first embodiment, the observation image imaging system OPT-B that obtains the image of the measurement object 500 is configured to have the depth of field not lower than the range of the light collecting position changed by the sweep light collecting unit, so that a difference in image formation position by the wavelength can be absorbed by the depth of field of the observation image imaging system OPT-B even if the imaging device 9 takes the color image. Therefore, the trouble that the definition of the image surrounding the measuring point is lowered in the color image can be avoided even if the imaging device 9 takes the color image.

Second Embodiment

Figure 4:
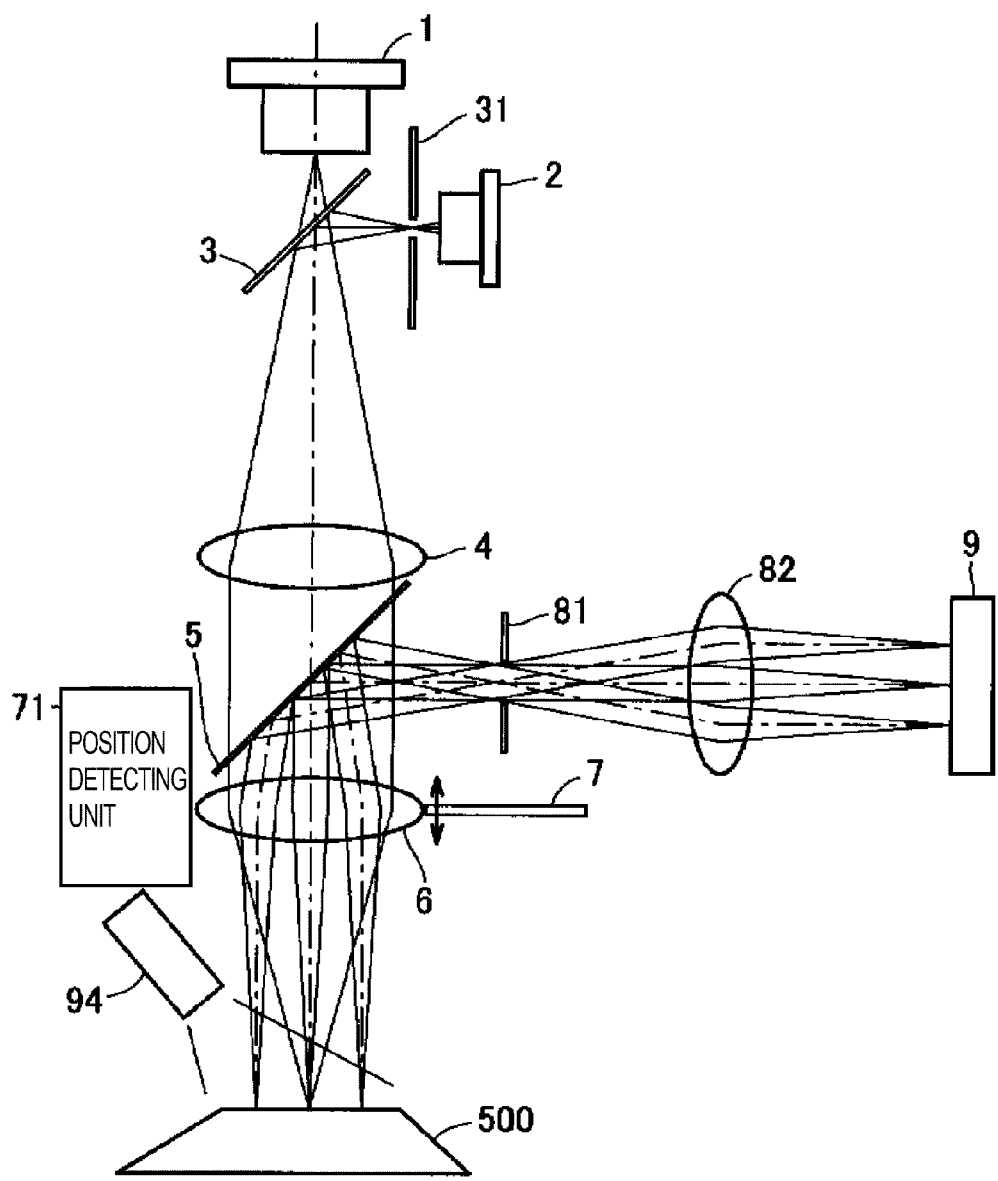
FIG. 4 schematically illustrates an entire configuration of a displacement sensor according to a second embodiment of the present invention.

FIG. 4 schematically illustrates an entire configuration of a displacement sensor according to a second embodiment of the present invention.

The displacement sensor of the second embodiment differs from the displacement sensor of the first embodiment of FIG. 1 in that, instead of the collimator lens 4, the objective lens 6 is oscillated by the oscillator 7 in the two-headed direction of FIG. 4.

In the displacement sensor of the present invention, the collimator lens 4 may be swept (oscillated) or the objective lens 6 may be swept (oscillated) in order to change the collecting position of the light passing through the objective lens 6.

In the displacement sensor of the second embodiment, the opening diameter φA is determined such that the depth of field a is not lower than the sweep amplitude of the objective lens 6, and the opening diameter φA is set to the diameter of the diaphragm hole of the diaphragm plate 81.

Third Embodiment

Figure 5:
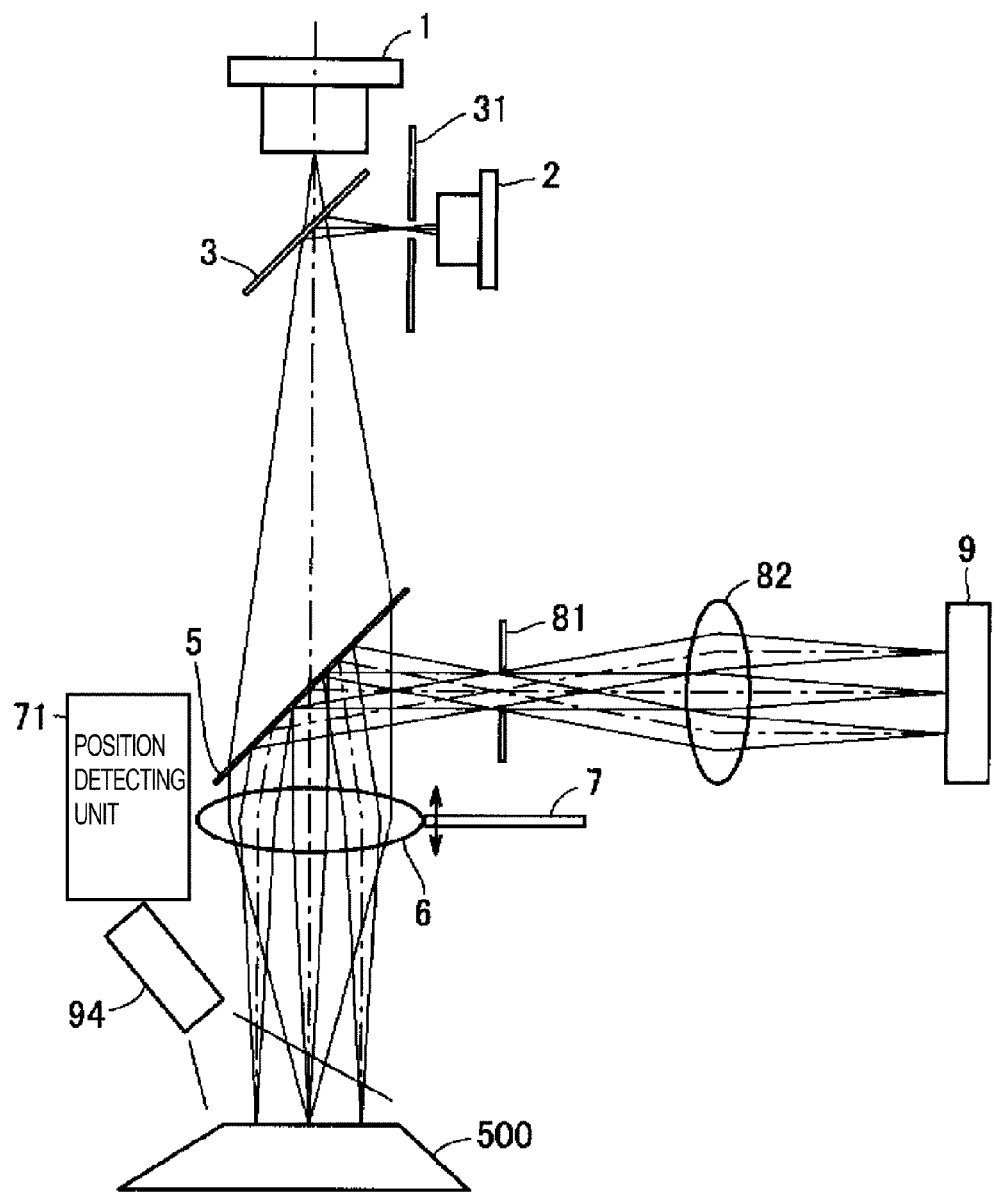
FIG. 5 schematically illustrates an entire configuration of a displacement sensor according to a third embodiment of the present invention.

FIG. 5 schematically illustrates an entire configuration of a displacement sensor according to a third embodiment of the present invention.

The displacement sensor of the third embodiment differs from the displacement sensor of the second embodiment of FIG. 4 in that the collimator lens 4 is eliminated.

In the displacement sensor of the present invention, when the collimator lens 4 is eliminated, the light emitted from the light source 1 passes through the objective lens 6, and the light is not collected to the center of the depth of field of the objective lens 6. However, the trouble that the definition of the image surrounding the measuring point is lowered in the color image can be lowered to an extent in which the trouble has no influence on the measurement of the surface displacement of the measurement object 500 and the taking of the surface image.

Accordingly, the displacement sensor of the present invention may be configured such that, while the collimator lens 4 is eliminated, the light emitted from the light source 1 is directly collected by the objective lens 6 to measure the surface displacement of the measurement object 500.

Fourth Embodiment

FIG. 6A schematically illustrates an entire configuration of a displacement sensor according to a fourth embodiment of the present invention.

The displacement sensor of the fourth embodiment differs from the displacement sensor of the first embodiment of FIG. 1 in that a low-reflectance transparent plate 51 is provided instead of the beam splitter 5. As illustrated in FIG. 6B, a high-reflectance region 52 is provided in a substantially central portion of the low-reflectance transparent plate 51. The high-reflectance region 52 is formed by evaporation coating on the low-reflectance transparent plate 51. Therefore, although the visible light reflected on the measurement object 500 is permitted through the low-reflectance transparent plate 51, the visible light is reflected from the high-reflectance region 52, and the visible light is delivered to the imaging device 9 through the image formation lens 82.

It is necessary that the diameter of the high-reflectance region 52 be set to the opening diameter φA of the first embodiment. In the fourth embodiment, both the functions of the beam splitter 5 and diaphragm plate 81 of the first embodiment are realized by the low-reflectance transparent plate 51 including the high-reflectance region 52 obtained by evaporation coating.

In the fourth embodiment, a distance RS1 from the objective lens 6 to the high-reflectance region 52 is set to the rear-side focal distance of the objective lens 6, a distance RS2 from the high-reflectance region 52 to the image formation lens 82 is set to the front-side focal distance of the image formation lens 82, and a distance RS3 from the image formation lens 82 to the imaging device 9 is set to the rear-side focal distance of the image formation lens 82.

In the displacement sensor of the fourth embodiment having the configuration in which the beam splitter and the diaphragm plate are integrally formed, because the distance to the diaphragm plate can be shortened, the displacement sensor of the fourth embodiment is particularly effectively used in the short rear-side focal distance of the objective lens 6, that is, the objective lens 6 having high NA (Numerical Aperture).

Fifth Embodiment

Figures 7A, 7B:
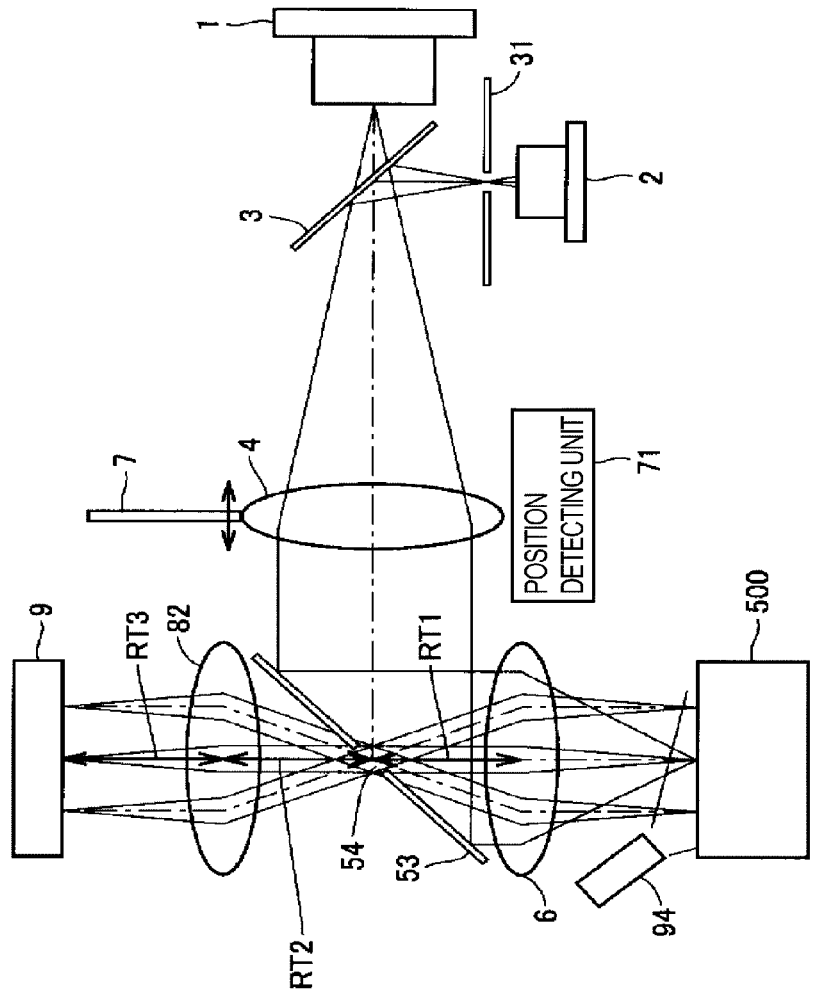
FIGS. 7A and 7B schematically illustrate an entire configuration of a displacement sensor according to a fifth embodiment of the present invention.

FIG. 7A schematically illustrates an entire configuration of a displacement sensor according to a fifth embodiment of the present invention.

The displacement sensor of the fifth embodiment differs from the displacement sensor of the first embodiment of FIG. 1 in that a mirror 53 is provided instead of the beam splitter 5. As illustrated in FIG. 7B, a diaphragm hole 54 is made in a substantially central portion of the mirror 53. Therefore, although the light reflected from the measurement object 500 is reflected in the place except the diaphragm hole 54 of the mirror 53, the light that is reflected from the measurement object 500 to reach the diaphragm hole 54 is delivered to the imaging device 9 through the image formation lens 82.

It is necessary that the diameter of the diaphragm hole 54 be set to the opening diameter φA of the first embodiment. In the fifth embodiment, both the functions of the beam splitter 5 and diaphragm plate 81 of the first embodiment are realized by the mirror 53 in which the diaphragm hole 54 is made.

In the fifth embodiment, a distance RT1 from the objective lens 6 to the mirror 53 is set to the rear-side focal distance of the objective lens 6, a distance RT2 from the mirror 53 to the image formation lens 82 is set to the front-side focal distance of the image formation lens 82, and a distance RT3 from the image formation lens 82 to the imaging device 9 is set to the rear-side focal distance of the image formation lens 82.

In the displacement sensor of the fifth embodiment having the configuration in which the beam splitter and the diaphragm plate are integrally formed, because the distance to the diaphragm plate can be shortened, the displacement sensor of the fifth embodiment is particularly effectively used in the short rear-side focal distance of the objective lens 6, that is, the objective lens 6 having high NA (Numerical Aperture).

Sixth Embodiment

Figure 8A:
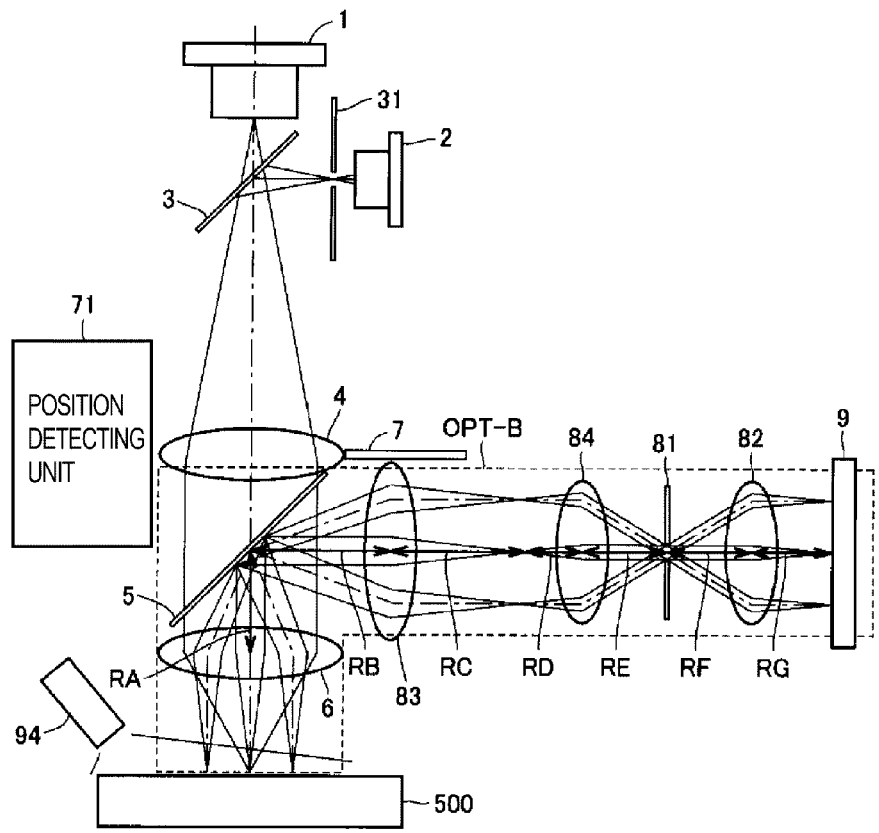
FIGS. 8A and 8B schematically illustrate an entire configuration of a displacement sensor according to a sixth embodiment of the present invention.

FIG. 8A schematically illustrates an entire configuration of a displacement sensor according to a sixth embodiment of the present invention.

Figure 8B:
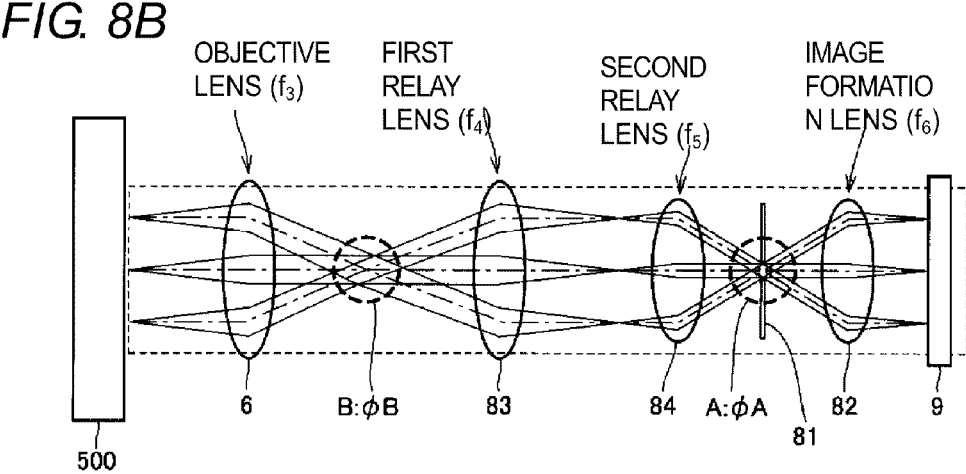

The displacement sensor of the sixth embodiment differs from the displacement sensor of the first embodiment of FIG. 1 in that relay lens 83 and 84 are provided between the beam splitter 5 and the diaphragm plate 81. In the sixth embodiment, the light emitted from the imaging light source 94 is reflected on the measurement object 500, the light forms an image on the imaging device 9 through the objective lens 6, the beam splitter 5, the relay lens 83, the relay lens 84, (the diaphragm hole of) the diaphragm plate 81, and the image formation lens 82. FIG. 8B illustrates a virtual state in which the optical path of the observation image imaging system OPT-B of FIG. 8A is linearly formed.

The detailed configuration of the observation image imaging system OPT-B in the displacement sensor of the sixth embodiment will be described below.

FIG. 8A illustrates an optical path length between components of the observation image imaging system OPT-B in the displacement sensor of the sixth embodiment. Specifically, a distance RA expresses an optical path length between the objective lens 6 and the beam splitter 5, a distance RB expresses an optical path length between the beam splitter 5 and the relay lens 83, a distance RC expresses an optical path length between virtual diaphragm existence points in the light between the relay lens 83 and the relay lens 84, a distance RD expresses an optical path length between the virtual diaphragm existence point and the relay lens 84, a distance RE expresses an optical path length between the relay lens 84 and the diaphragm hole of the diaphragm plate 81, a distance RF expresses an optical path length between the diaphragm hole of the diaphragm plate 81 and the image formation lens 82, and a distance RG expresses an optical path length between the image formation lens 82 and the imaging device 9. The "virtual diaphragm existence point" means a point at which the light reflected from the measurement object 500 forms the image by the objective lens 6 and the relay lens 83 with respect to the light that can pass through the diaphragm hole of the diaphragm plate 81 in the light that passes through the objective lens 6, the relay lens 83, and the relay lens 84.

In the sixth embodiment, it is assumed that f3 is a focal distance of the objective lens 6, f4 is a focal distance of the relay lens 83 (first relay lens), f5 is a focal distance of the relay lens 84 (second relay lens), and f6 is a focal distance of the image formation lens 82.

In the displacement sensor of the sixth embodiment, the distance RG is set to the rear-side focal distance of the image formation lens 82 in order that the light reflected from the measurement object 500 forms the image on the imaging device 9 through the image formation lens 82.

In the displacement sensor, the distance RF is set to the front-side focal distance of the image formation lens 82 in order that the light reflected from the measurement object 500 forms the image on the imaging device 9 through the diaphragm hole of the diaphragm plate 81 and the image formation lens 82.

In the displacement sensor, the distance RE is set to the rear-side focal distance of the relay lens 84 in order that the light passing through the relay lens 84 reaches the image formation lens 82 through the diaphragm hole of the diaphragm plate 81.

In the displacement sensor, the distance RD is set to the front-side focal distance of the relay lens 84, and the distance RC is set to the rear-side focal distance of the relay lens 83.

In the displacement sensor, the sum of the distance RB and the distance RA is equal to the sum of the rear-side focal distance of the objective lens 6 and the front-side focal distance of the relay lens 83.

The diameter of the diaphragm hole of the diaphragm plate 81 will be described below. In FIG. 8B, $\phi B$ is a diameter of an optical flux of the "virtual diaphragm existence point". In the sixth embodiment, it is considered that a relationship expressed by the following equation (8) holds between the diameter $\phi B$ of the optical flux and the diameter $\phi A$ of the diaphragm hole of the diaphragm plate 81.

$$\phi B = \phi A \times f4/f5 \tag{8}$$

Figure 9:
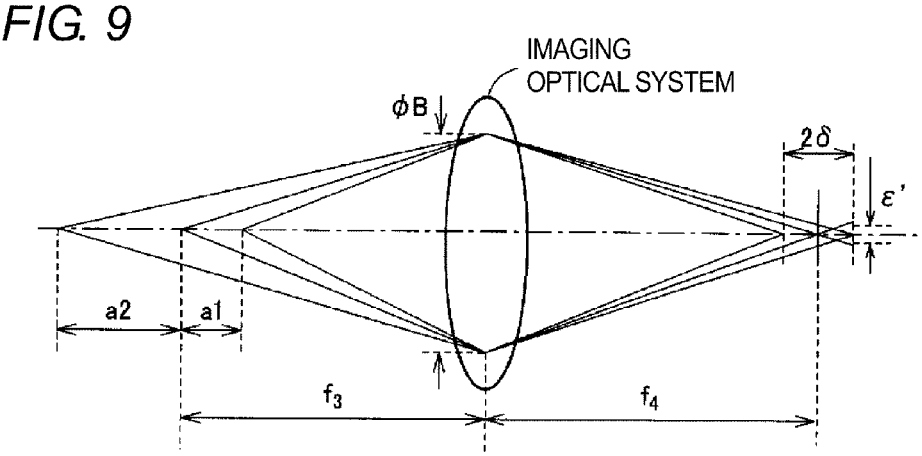
FIG. 9 illustrates a condition for an opening diameter of a diaphragm hole in a diaphragm plate of the displacement sensor of FIG. 8.

In the sixth embodiment, as with the first embodiment of FIG. 3, the focused position of the objective lens 6 changes by the sweep (oscillation) of the collimator lens 4. Accordingly, assuming that a is the depth of field of the objective lens 6, a1 is the front-side depth of field the objective lens 6, and a2 is the rear-side depth of field of the objective lens 6 (see FIG. 9), as with the equation (1), the relationship among the depth of field a, the front-side depth of field a1, and the rear-side depth of field a2 can be expressed by an equation (9).

$$a = a1 + a2 \tag{9}$$

The front-side depth of field a1 and rear-side depth of field a2 of the objective lens 6 can be described by the following equations (10) and (11) using F-number for the relay lens 83. In the equations (10) and (11), F' is F-number for the relay lens 83, and $\epsilon'$ is a diameter of a permissible circle of confusion in the displacement sensor of the sixth embodiment.

$$a1 = f3^2 \cdot \epsilon' \cdot F'/(f4^2 + f3 \cdot \epsilon' \cdot F') \tag{10}$$

$$a2 = f3^2 \cdot \epsilon' \cdot F'/(f4^2 - f3 \cdot \epsilon' \cdot F') \tag{11}$$

In the displacement sensor of the sixth embodiment, it is considered that the diameter $\epsilon'$ of a permissible circle of confusion is a diameter of a permissible circle of confusion at the "virtual diaphragm existence point". Therefore, the diameter $\epsilon'$ of a permissible circle of confusion is set as expressed in the following equation (12) using the equation (4).

[Formula 2]

$$\epsilon' = 2\sqrt{2} \cdot P \cdot f_5/f_6 \tag{12}$$

The F-number (F') is expressed by the following equation (13). In the equation (13), $\phi B$ is an opening diameter of the virtual diaphragm hole.

$$F' = f4/\phi B \tag{13}$$

When the equation (13) is substituted for the equations (10) and (11), the equations (10) and (11) can be rewritten into equations (14) and (15).

$$a1=(f32\cdot\epsilon'\cdot f4/\phi B)\cdot(f42+f3\cdot\epsilon'\cdot f4/\phi B) \quad (14)$$

$$a2=(f32\cdot\epsilon'\cdot f4/\phi B)\cdot(f42-f3\cdot\epsilon'\cdot f4/\phi B) \quad (15)$$

In the displacement sensor of the sixth embodiment, the diameter φA is determined from the equations (14), (15), and (8) such that the depth of field a is not lower than the amplitude of the sweep of the collimator lens 4, and the diameter φA is set to the diameter of the diaphragm hole of the diaphragm plate 81. Therefore, in the displacement sensor of the sixth embodiment, the opening diaphragm of the telecentric optical system is designed such that the telecentric optical system has the depth of field not lower than the range of the light collecting position changed by the sweep light collecting unit. The range of the light collecting position changed by the sweep light collecting unit is obtained by the product of the sweep range of the collimator lens 4 and the optical magnification of the confocal optical system.

In the displacement sensor of the sixth embodiment, after the light forms the image once through the relay lens 83, the light is converted into the collimated light through the relay lens 84, the light passes through the diaphragm hole, and the light forms the image on the imaging device 9 through the image formation lens 82. Therefore, the displacement sensor of the sixth embodiment is particularly effectively used in the short rear-side focal distance of the objective lens 6, that is, the objective lens 6 having high NA (Numerical Aperture), and the displacement sensor of the sixth embodiment can avoid the generation of a ghost on the imaging device 9. The ghost on the imaging device 9 is possibly generated by the light reflected from the low-reflectance transparent plate 51 around the mirror 52 when the mirror 52 of FIG. 6 is used.

Seventh Embodiment

Figure 10:
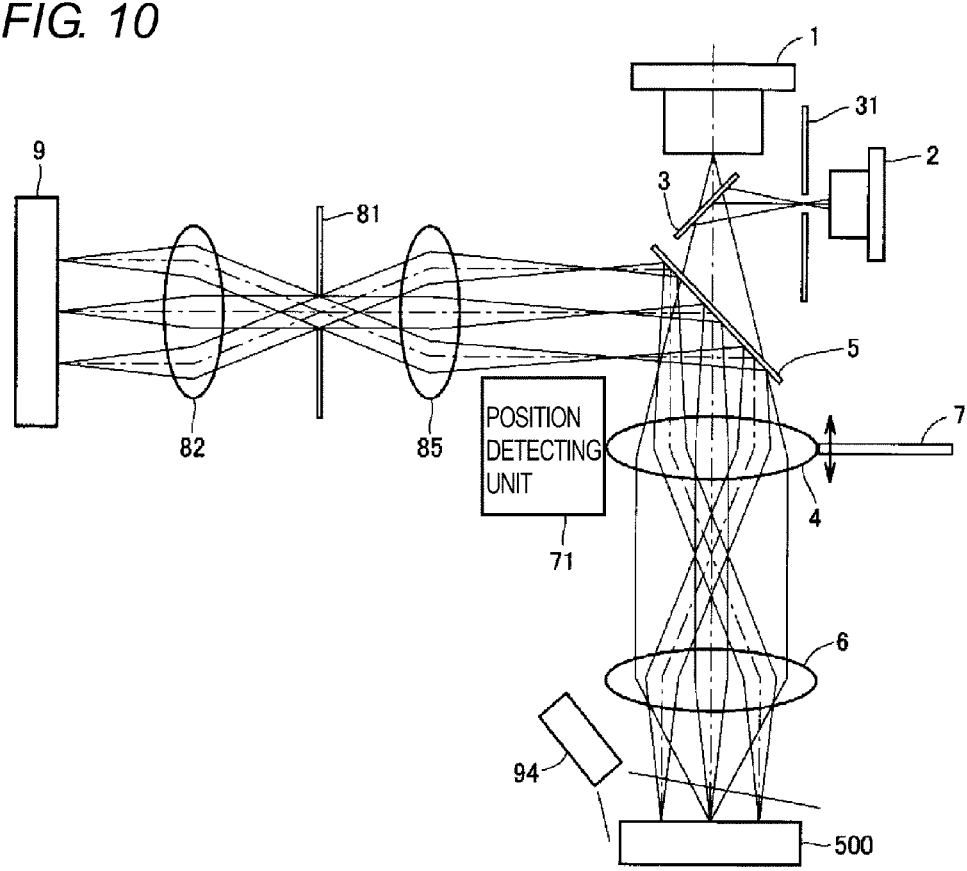
FIG. 10 schematically illustrates an entire configuration of a displacement sensor according to a seventh embodiment of the present invention.

FIG. 10 schematically illustrates an entire configuration of a displacement sensor according to a seventh embodiment of the present invention.

In the seventh embodiment, the beam splitter 5 is displaced at the back of the collimator lens 4 on the optical path of the light reflected from the measurement object 500.

In the seventh embodiment, the image taken by the imaging device 9 is formed based on the light that is reflected on the measurement object 500 and led to the imaging device 9 through the objective lens 6, the collimator lens 4, the beam splitter 5, the relay lens 85, the diaphragm hole of the diaphragm plate 81, and the image formation lens 82.

Eighth Embodiment

In a displacement sensor according to an eighth embodiment of the present invention, a turn on/off mode of the light emitted from the light source 1 and a turn on/off mode of the imaging in the imaging device 9 will be described. For example, the imaging device 9 includes CCD (Charge Coupled Device), and it can be assumed that the turn on/off mode of the imaging is a mode concerning a charge accumulation time.

Figure 11:
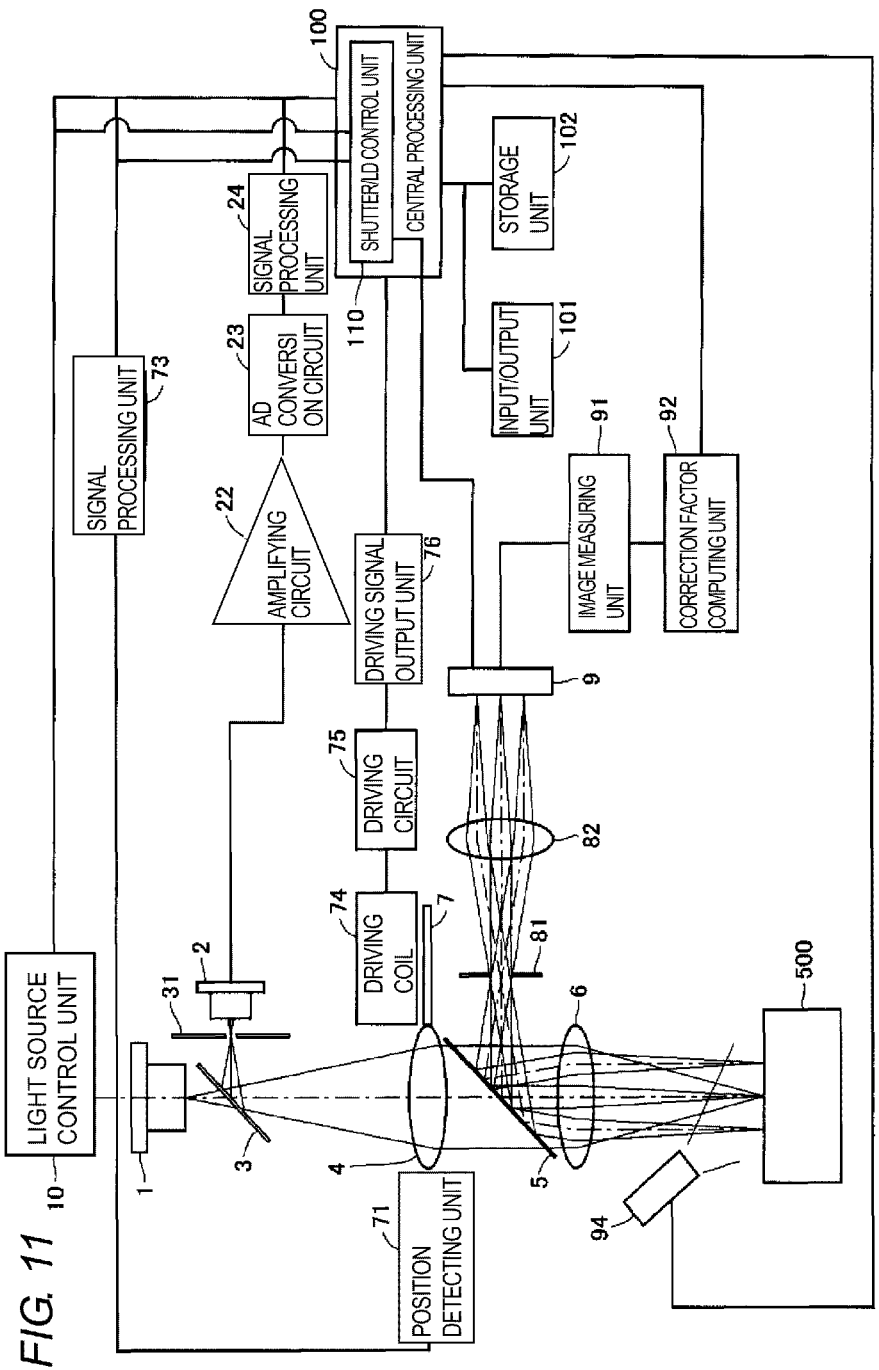
FIG. 11 schematically illustrates a block configuration of a displacement sensor according to an eighth embodiment of the present invention.

FIG. 11 illustrates a block configuration of the displacement sensor of the eighth embodiment. The block configuration of FIG. 11 is substantially similar to that of FIG. 2. However, in the eighth embodiment, particularly a shutter/light source control unit 110 is provided in the central processing unit 100.

Figure 12A:
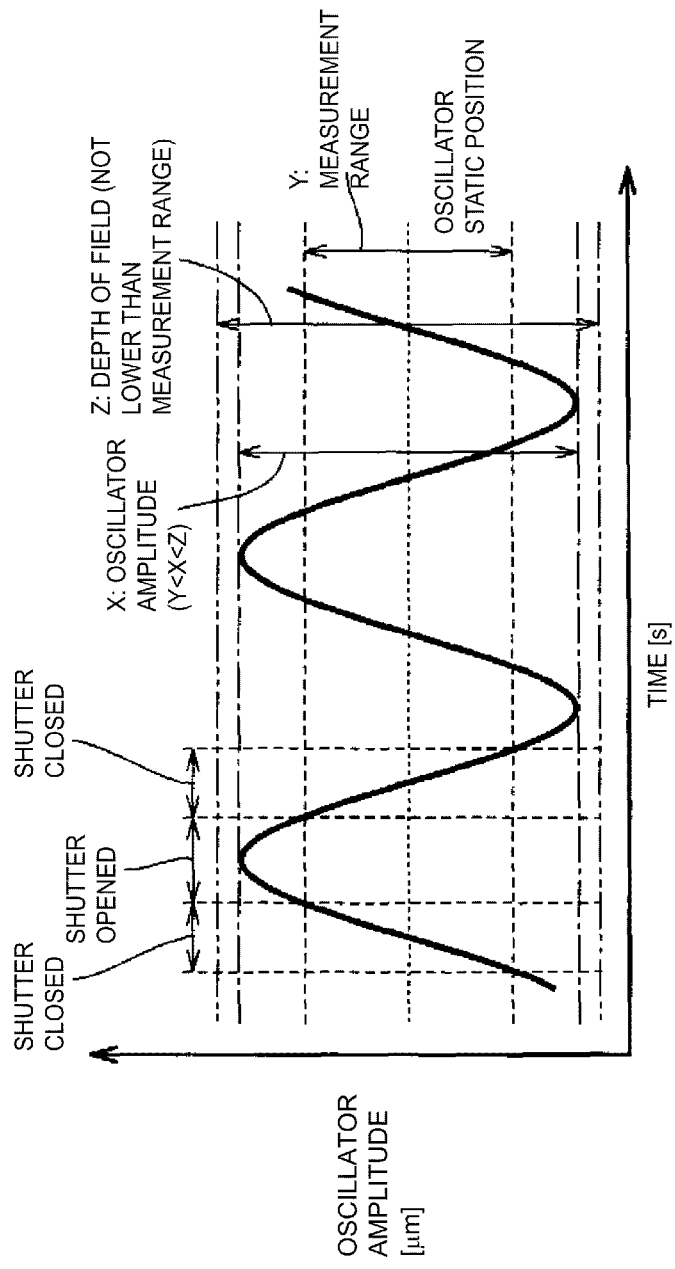
FIGS. 12A and 12B schematically illustrate a temporal change in oscillation state of an oscillator of the displacement sensor of FIG. 11.
Figure 12B:
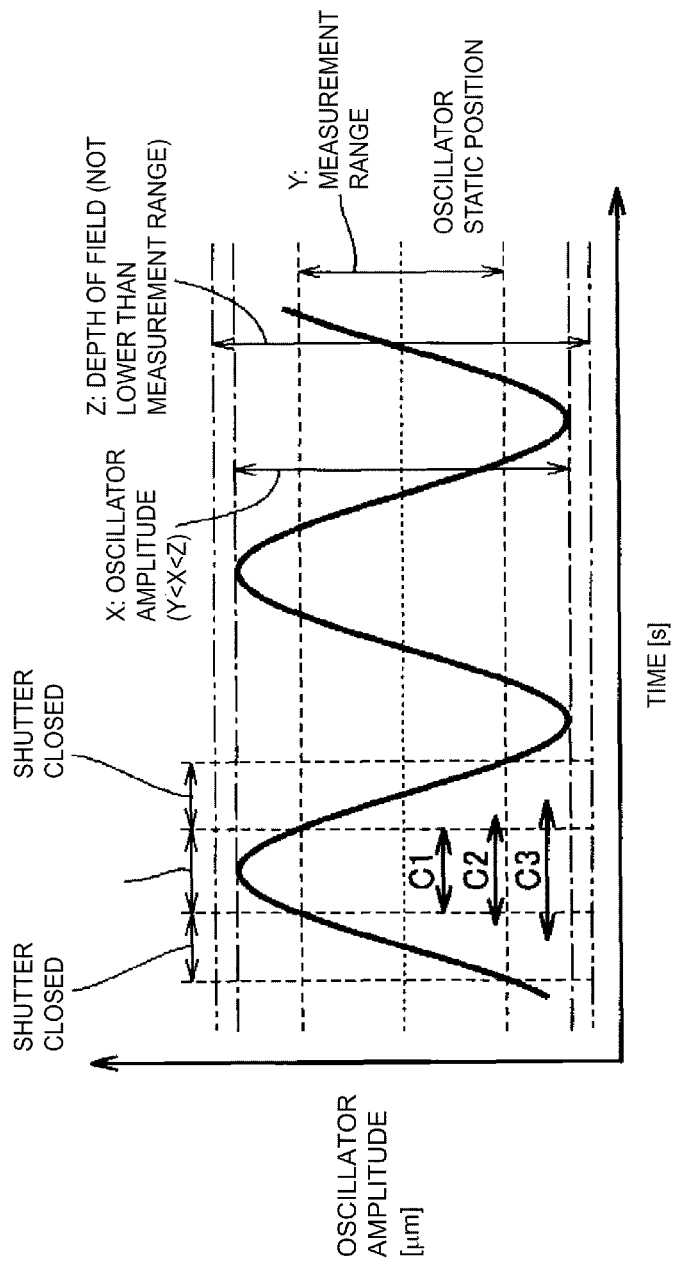

FIGS. 12A and 12B schematically illustrate a temporal change in oscillation state of the oscillator 7. It is assumed that the oscillation state of the oscillator 7 is identical to the oscillation state of the collimator lens 4.

In FIGS. 12A and 12B, it is assumed that X is amplitude of the oscillator 7, Z is a depth of field of the observation image imaging system OPT-B, and Y is an oscillation position range where the light receiving device 2 measures the surface position of the measurement object 500. In the eighth embodiment, a magnitude relationship among X, Y, and Z is determined as illustrated in FIGS. 12A and 12B. However, a relative magnitude ratio of X, Y, and Z is not limited to the ratio of FIG. 12.

Referring to FIG. 12A, the oscillator 7 is periodically oscillated. At an interval at which the oscillation position of the oscillator 7 is located within the range Y in each period, the central processing unit 100 lights on the light source 1 to cause the light receiving device 2 to receive the light, and the central processing unit 100 determines that the surface of the measurement object 500 exists in the collecting position of the light passing through the objective lens 6 in the oscillation position of the oscillator 7 when the light receiving amount becomes the maximum. Basically the light source 1 is not lit on at intervals except the interval at which the oscillation position of the oscillator 7 is located within the range Y ("LIGHT_OFF" interval in FIG. 12A).

Basically, at an interval at which the light source 1 is not lit on, the shutter/light source control unit 110 of the central processing unit 100 lights on the imaging light source 94 to put the imaging device 9 in a charge accumulation state. When the imaging device 9 includes the CCD, the charges accumulated at intervals except the interval at which the light source 1 is not lit on are discarded, and only the charges accumulated at the interval at which the light source 1 is not lit on are read.

In the shutter/light source control unit 110 of the central processing unit 100, an interval of the shutter opened state can be adjusted in each period.

FIGS. 13A to 13C illustrate a change of the image taken by the imaging device 9 in each interval when the interval of the shutter opened state is set to only the "LIGHT_OFF" interval and the interval including the interval at which the light source 1 is lit on as illustrated by intervals C1 to C3 of FIG. 12B. FIG. 13 also illustrates light receiving intensity of each image on a line indicated by an arrow. At the interval C1, the shutter is opened only at the "LIGHT_OFF" interval. At the interval C2, the shutter opened state includes the "LIGHT_OFF" interval and the interval at which the light source 1 is lit on. At the interval C3, the shutter opened state includes the "LIGHT_OFF" interval and the interval at which the light source 1 is lit on for a time longer than that of the interval C2.

A high-brightness point is included in central portions of the images of FIGS. 13B and 13C, while the high-brightness point is not included in the image of FIG. 13A. The high-brightness point corresponds to the collecting point of the light emitted from the light source 1 on the imaging device 9. In the images of FIGS. 13B and 13C that are obtained while the shutter is opened at the intervals C2 and C3 including the interval at which the laser beam is emitted from the light source 1, the measuring points such as points P11 and P12 are included as the high-brightness point in the image around the measuring point. On the other hand, in the image of FIG. 13A that is obtained while the shutter is opened at the interval C1 not including the interval at which the laser beam is emitted from the light source 1, the measuring point corresponding to the high-brightness point is not included. In the image of FIG. 13C that is obtained while the shutter is opened at the interval C3 including the interval at which the laser beam is emitted for a time longer than that of interval C2, the measuring point is clearly included (brightness at the point corresponding to the measuring point is enhanced) compared with the image of FIG. 13B that is obtained while the shutter is opened at the interval C2.

In the displacement sensor of the eighth embodiment, the interval of the shutter opened state can be controlled to determine whether the measuring point is included in the image taken by the imaging device 9 or adjust how much brightness (clearness) the measuring point is included.

Specifically, in the displacement sensor of the eighth embodiment, for example, when the user inputs the information whether a measuring spot is included in the image or how much the measuring spot is included to the input/output unit 101, the shutter/light source control unit 110 of the central processing unit 100 determines a relationship between the interval at which the light source 1 is lit on and the interval at which the shutter is opened according to the input information.

Ninth Embodiment

FIG. 14 schematically illustrates an entire configuration of a displacement sensor according to a ninth embodiment of the present invention.

The displacement sensor of FIG. 14 differs from the displacement sensor of FIG. 14A in that the objective lens 61 is provided instead of the objective lens 6. In the displacement sensors of FIGS. 14A and 14B, the objective lens 6 is accommodated in a case 60, and the objective lens 61 is accommodated in a case 62.

In the displacement sensor of the ninth embodiment, plural objective lenses such as the objective lens 6 and the objective lens 61 are attached in an exchangeable way to be able to perform the displacement measurement and image taking of the measurement object 500.

The objective lens 6 differs from the objective lens 61 in the focal distance. As described above, in the displacement sensor of the present invention, in taking the image with the imaging device 9, preferably the sum of the distance on the optical path from the objective lens to the beam splitter and the distance from the beam splitter to the diaphragm hole of the diaphragm plate (that is, the distance on the optical path from the objective lens to the diaphragm hole of the diaphragm plate) is set to the rear-side focal distance of the objective lens.

Therefore, in the displacement sensor of the present invention, when the objective lens is replaced with another objective lens having a different focal distance, each objective lens is attached such that the distance to the diaphragm hole of the diaphragm plate satisfies the above-described condition.

That is, in the displacement sensor of FIG. 14A, the objective lens 6 is attached in the position in which the sum of the distance RA and the distance RB becomes the rear-side focal distance of the objective lens 6. In the displacement sensor of FIG. 14B, the objective lens 61 is attached in the position in which the sum of the distance RAX (distance on the optical path from the objective lens 61 to the beam splitter 5) and the distance RB becomes the rear-side focal distance of the objective lens 61.

Figure 15:
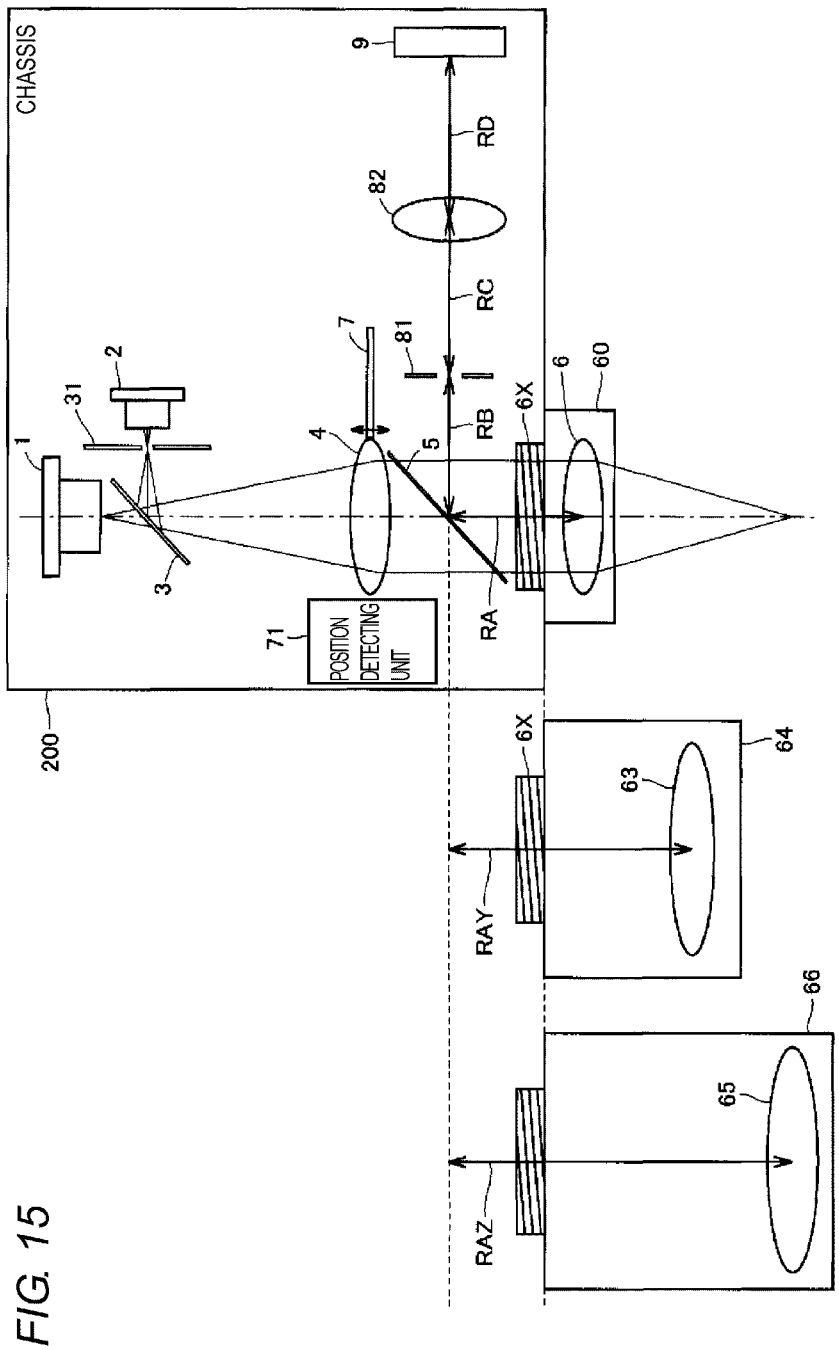
FIG. 15 schematically illustrates the entire configuration of the displacement sensor of the ninth embodiment of the present invention.
Figure 16:
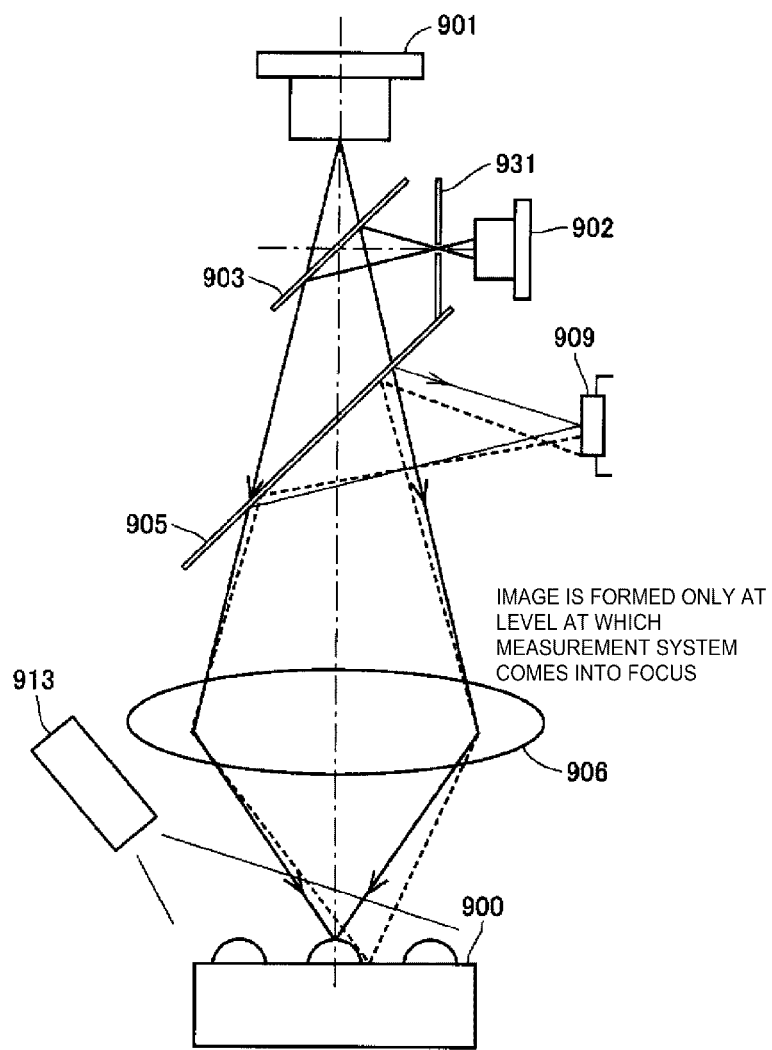
FIG. 16 schematically illustrates a configuration of a conventional displacement sensor.
Figure 17A:
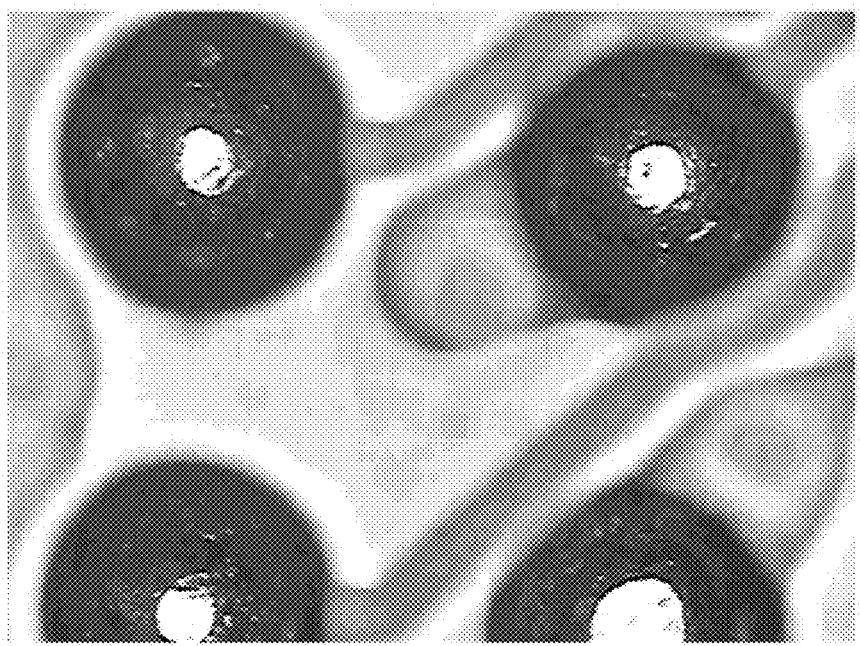
FIGS. 17A and 17B illustrate an example of an obtained image in the conventional displacement sensor.
Figure 17B:
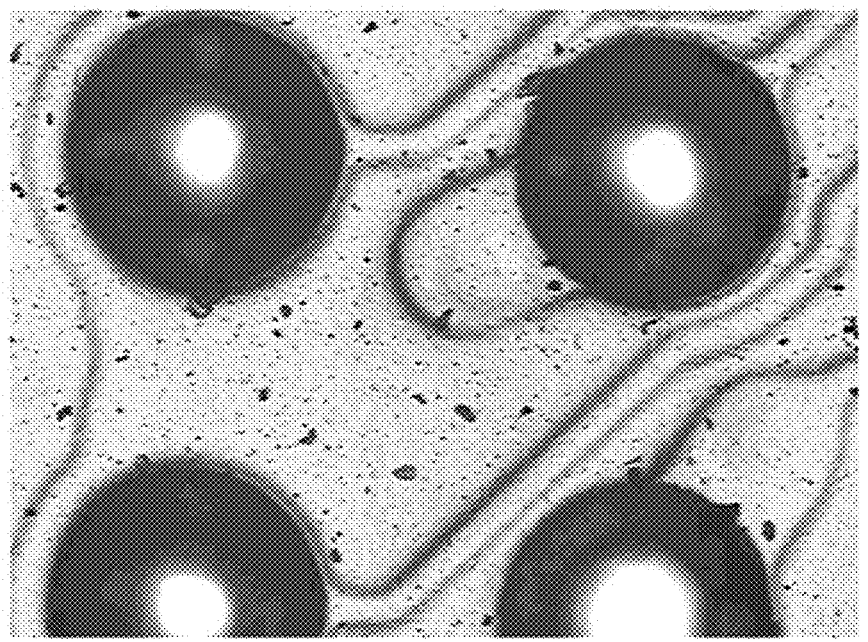

In the displacement sensor of the ninth embodiment, at least three kinds of objective lenses may be used in the exchangeable way as illustrated in FIG. 15.

In the displacement sensor of FIG. 15, the objective lens 6, an objective lens 63, and an objective lens 65 are used in the exchangeable way.

In the state in which each objective lens is attached, the distance (sum of distance RA and distance RB) on the optical path from the objective lens 6 to the diaphragm hole is set to the rear-side focal distance of the objective lens 6, the distance (sum of distance RAY and distance RB) on the optical path from the objective lens 63 to the diaphragm hole is set to the rear-side focal distance of the objective lens 63, and the distance (sum of distance RAZ and distance RB) on the optical path from the objective lens 65 to the diaphragm hole is set to the rear-side focal distance of the objective lens 65.

In the displacement sensor of FIG. 15, members except the objective lenses are accommodated in a chassis 200. The objective lens 6, the objective lens 63, and the objective lens 65 are respectively accommodated in cases 60, 64, and 66 that can be attached to the chassis 200 so as to satisfy the distance relationship. Therefore, in the displacement sensor, the objective lenses having different focal distances can easily be exchanged.

The disclosed embodiments are described only by way of example, and it is noted that the present invention is not limited to the embodiments. The scope of the present invention is expressed by not the description but claims of the present invention, and the scope of the present invention includes meanings equivalent to claims and all modifications within a range of claims. The technical thoughts described in the embodiments can be realized while combined as much as possible.

What is claimed is:

1. A displacement sensor including a confocal displacement meter that determines a surface displacement from a light collecting position at time a light receiving amount becomes maximum and comprises:
    a first light projecting unit that emits light having a first wavelength;
    a first light receiving unit that receives the light having the first wavelength;
    a sweep light collecting unit that collects the light emitted from the first light projecting unit toward a measurement object to illuminate the measurement object, changes continuously a collecting position of the light along an optical axis direction of the collected light, causes reflected light of the light with which the measurement object is illuminated to travel in a direction opposite to an optical path of the light emitted from the first light projecting unit, and leads the reflected light to the first light receiving unit; and
    a first optical path separating unit that separates an optical path of the reflected light from an optical path from the first light projecting unit to the measurement object; the displacement sensor comprising:
    a second light projecting unit that emits light having a second wavelength different from the first wavelength to the measurement object;
    a second optical path separating unit that separates an optical path of the light having the second wavelength reflected on the measurement object through the optical path of the reflected light; and
    a second light receiving unit that receives the light whose optical path is separated by the second optical path separating unit, and
    wherein the second light receiving unit is a telecentric optical system including an imaging device and an opening diaphragm, a diameter of the opening diaphragm being designed such that the telecentric optical system has a depth of field not lower than a range in which the light collecting position is changed by the sweep light collecting unit.

2. The displacement sensor according to claim 1, wherein the sweep light collecting unit includes:
- an objective lens that collects the light emitted from the first light projecting unit toward the measurement object to illuminate the measurement object; and
- a collimator lens that is provided between the first light projecting unit and the objective lens in order to convert the light emitted from the first light projecting unit to the objective lens into parallel light, and
- the second optical path separating unit is provided between the objective lens and the collimator lens.

3. The displacement sensor according to claim 1, wherein the second optical path separating unit is formed by a mirror having an opening through which the light having the second wavelength passes, the diameter of the opening diaphragm being illuminated with the light having the second wavelength, and
- the second optical path separating unit and the opening diaphragm are integrally formed.

4. The displacement sensor according to claim 1, wherein the second light receiving unit includes a relay lens that is provided between the second optical path separating unit and the opening diaphragm.

5. The displacement sensor according to claim 1, wherein
- the second light receiving unit receives the light delivered to the opening diaphragm through the objective lens, the light being the light reflected on the measurement object,
- the objective lens is attached in a position in which an optical path length of the light reflected on the measurement object to the opening diaphragm becomes a rear-side focal distance of the objective lens,
- the objective lens is exchangeably configured into another objective lens having the rear-side focal distance different from that of the objective lens, and
- the another objective lens is attached in a position in which the optical path length of the light reflected on the measurement object to the opening diaphragm becomes the rear-side focal distance of the another objective lens, when the objective lens is exchanged into the another objective lens.

6. The displacement sensor according to claim 1, further comprising:
- a first adjusting unit that adjusts whether the light emitted from the first light projecting unit on the measurement object is included in an image taken with the imaging device; and
- a second adjusting unit that adjusts brightness of the image taken with the imaging device,
- wherein, by controlling an imaging device accumulation time, a first light projecting unit emitting time and a second light projecting unit emitting time, the first adjusting unit adjusts whether the light emitted from the first light projecting unit is included or not and the second adjusting unit adjusts the brightness of the image taken with the imaging device.

\* \* \* \* \*